(12) United States Patent
Levy et al.

(10) Patent No.: US 9,549,307 B2
(45) Date of Patent: Jan. 17, 2017

(54) SERVICE DELIVERY CONDITION CHANGE MANAGEMENT

(75) Inventors: Thomas Levy, Paris (FR); Maryse Gardella, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 845 days.

(21) Appl. No.: 13/702,020

(22) PCT Filed: Jun. 6, 2011

(86) PCT No.: PCT/EP2011/059297
§ 371 (c)(1),
(2), (4) Date: Feb. 20, 2013

(87) PCT Pub. No.: WO2011/154356
PCT Pub. Date: Dec. 15, 2011

(65) Prior Publication Data
US 2013/0143523 A1    Jun. 6, 2013

(30) Foreign Application Priority Data
Jun. 11, 2010 (FR) ...................................... 10 54624

(51) Int. Cl.
*H04M 11/00* (2006.01)
*H04W 4/26* (2009.01)
(Continued)

(52) U.S. Cl.
CPC ................ *H04W 4/26* (2013.01); *H04L 12/14* (2013.01); *H04L 12/1467* (2013.01);
(Continued)

(58) Field of Classification Search
CPC .......... H04W 4/02; H04W 64/00; H04W 4/04; H04W 4/043; H04W 4/028; H04W 84/12
(Continued)

(56) References Cited

U.S. PATENT DOCUMENTS 6,154,778 A     11/2000  Koistinen et al.
8,538,379 B1 *   9/2013  Stachiw et al. ............... 455/406
(Continued)

FOREIGN PATENT DOCUMENTS

CN       101365100 A    2/2009
JP       2006-345057 A  12/2006
(Continued)

OTHER PUBLICATIONS

H. Hakala et al., "Diameter Credit-Control Application," Internet Engineering Task Force (IETF), XP015041993, 1-114 pages, Aug. 1, 2005.
(Continued)

*Primary Examiner* — Joseph Arevalo
(74) *Attorney, Agent, or Firm* — Fay Sharpe, LLP

(57) ABSTRACT

In order to manage a change in conditions of using a service associated with a communication in progress established by a user terminal (TU) within its communications network (RT), a server determines that the user's account does not permit the delivery of the service with a change in the conditions of using a service, after the receipt of a first request derived from a network element, said request comprising an identifier of the service regarding the communication and a parameter defining the change in conditions of using the service, and the server transmits to the network element a response containing a code indicating that the delivery of the service is authorized only with other conditions of using the service, in order for the network element to transmit to the server a second request containing another parameter defining another change in conditions of using the service.

8 Claims, 2 Drawing Sheets

Figure 1:
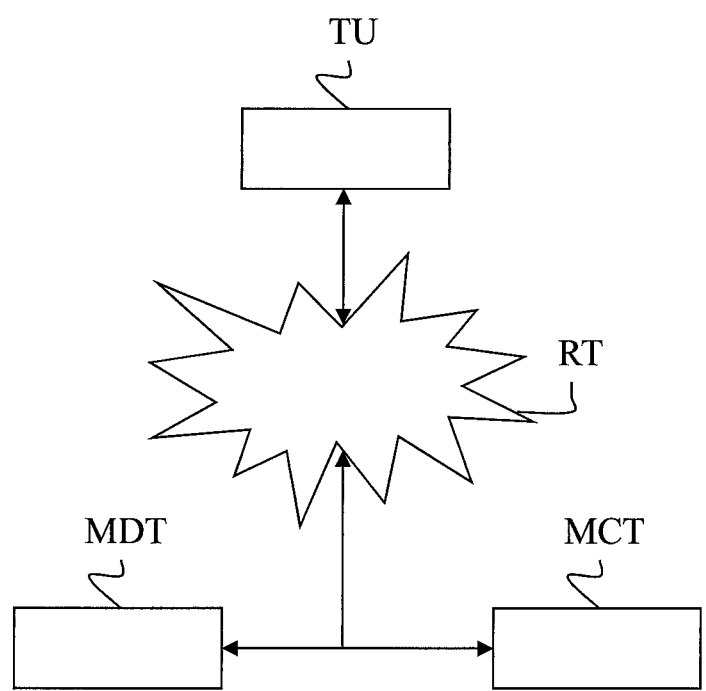

(51) Int. Cl.
   *H04L 12/14*      (2006.01)
   *H04L 12/54*      (2013.01)
   *H04L 12/24*      (2006.01)
   *H04L 12/917*     (2013.01)
   *H04M 15/00*      (2006.01)
   *H04L 29/06*      (2006.01)
   *H04L 12/911*     (2013.01)

(52) U.S. Cl.
   CPC ...... *H04L 12/1485* (2013.01); *H04L 12/5695* (2013.01); *H04L 41/5054* (2013.01); *H04L 47/76* (2013.01); *H04L 65/1016* (2013.01); *H04L 65/1083* (2013.01); *H04M 15/80* (2013.01); *H04M 15/81* (2013.01); *H04L 47/826* (2013.01)

(58) Field of Classification Search
   USPC ............ 455/418, 557, 405, 406, 426, 456.1, 46.3, 455/556.1, 41.1; 709/224
   See application file for complete search history.

(56) References Cited

U.S. PATENT DOCUMENTS

| | | | |
|---|---|---|---|
| 2007/0234048 A1* | 10/2007 | Ziv ........................ | H04M 3/56 |
| | | | 713/159 |
| 2011/0314145 A1* | 12/2011 | Raleigh et al. ............... | 709/224 |
| 2012/0054751 A1* | 3/2012 | Iikura et al. .................. | 718/100 |
| 2014/0094159 A1* | 4/2014 | Raleigh et al. ............... | 455/418 |

FOREIGN PATENT DOCUMENTS

| | | |
|---|---|---|
| JP | 2012-507223 A | 3/2012 |
| WO | 2010/049002 A1 | 5/2010 |

OTHER PUBLICATIONS

International Search Report for PCT/EP2011/059297 dated Jun. 30, 2011.

* cited by examiner

SERVICE DELIVERY CONDITION CHANGE MANAGEMENT

The present invention pertains to the management of changes in conditions for delivering a service associated with a current communication established by a user terminal and, more specifically, the management of changes in conditions for delivering a service that cause a change in billing conditions for delivering the service.

The document 3GPP TS32.299 defines a Ro interface for real-time charging between a Charging Trigger Function (CTF) module and an Online Charging System (OCS) module.

Trigger and re-authorization functions define events that the CTF module must monitor while delivering a service. Whenever such an event takes place—for example, a change of location or a change in quality of service—the CTF module must trigger a reauthorization for the OCS module in order to adapt the service's charging.

The OCS module monitors the delivery of a service by means of a Diameter session, during which charging is performed by reserving units. If, during the delivery of a service, a change takes place that may influence rates, the CTF module must produce a message to reserve new units with updated conditions.

For example, a change may be a modification of the number of participants in a conference, or a modification of a type of media in a multimedia call, or a change in quality of service.

Subsequent to that change, the OCS module may reject a reservation of new units made with the updated conditions for a user who has requested and is paying for the service. For example, the service with the updated conditions may be billed to a specific sub-account that has no credit.

Currently, the Diameter Ro protocol does not allow conditional changes while delivering a service. If the OCS module is not capable of delivering the service with the amended charging conditions, the OCS module transmits a reply with a Result-Code that contains a field filled by an Attribute-Value Pair (AVP) that corresponds to a failure, with this reply ending the Diameter session and the delivery of the service.

One objective of the invention is to remedy the aforementioned shortcomings by ensuring continuity of service whenever the charging conditions associated with the service happen to change.

To achieve this goal, a method for managing a change in a usage condition of a service associated with a current communication established by a user terminal within a telecommunications network comprises the following steps for a server included within the telecommunications network:

after receiving a first request coming from a network element capable of generating charging events while monitoring the communication's use of the network's resources, said request comprising a service identifier related to the communication and a parameter defining a service usage condition change, determining that the user's account does not allow the delivery of the service with the change in a service's usage conditions and transmitting to the network element a reply containing a code indicating that the delivery of the service is authorized only with other conditions for using the service, in order for the network element to transmit a second request to the server, the second request containing another parameter defining a service usage condition change different from the one contained in the first request.

Advantageously, the invention offers an additional feature to the telecommunication network, allowing a conditional change in charging conditions. In other words, if the conditions for delivering a service happen to change, and the server that comprises an OCS module is no longer able to deliver and bill the service under the altered conditions, the OCS module allows the network element that comprises a CTF module to continue delivering the service under other conditions rather than terminating the service.

The invention also pertains to a method for managing a change in a usage condition of a service associated with a current communication established by a user terminal within a telecommunications network, comprising the following steps in a network element capable of generating charging events while monitoring the communication's use of the network's resources:

transmitting a first request to a server, said request comprising an identifier of the service related to the communication and a parameter defining a service usage condition change, in order for the server to determine that the user's account does not allow the delivery of the service with the service usage condition change, and to transmit to the network element a reply containing a code indicating that the delivery of the service is authorized only with other conditions for using the service, and transmitting a second request to the server, the second request containing another parameter defining a service usage condition change different from the one contained within the first request.

According to other characteristics of the invention, the parameter contained within the second request may define a new service usage condition change different from the requested condition change contained within the first request, which does not match the old service usage conditions prior to the transmission of the first request, or the parameter contained within the second request may define a new service usage condition change that matches the old service usage conditions prior to the transmission of the first request.

According to another characteristic of the invention, the reply may contain a validity time defining a period during which the network element may transmit another request to the server; upon the expiration of that period, the session shall terminate if no request has been transmitted.

The invention also pertains to a server for managing a change in a usage condition of a service associated with a current communication established by a user terminal within a telecommunications network, comprising:

means for determining that the user's account does not allow the delivery of the service with a change in the conditions for using a service, after the receipt of a first request coming from a network element capable of generating charging events while monitoring the communication's use of the network's resources, said request comprising a service identifier related to the communication and a parameter defining the service's usage condition change, means for transmitting to the network element a reply containing a code indicating that the delivery of the service is authorized only with other conditions for using the service, in order for the network element to transmit a second request to the server, the second request containing another parameter defining a service usage condition change different from the one contained in the first request.

The invention also pertains to a network element for managing a change in a usage condition of a service associated with a current communication established by a user terminal within a telecommunications network, the network element being capable of generating charging events while monitoring the communication's use of the network's resources and comprising:

means for transmitting a first request to a server, said request comprising an identifier of the service related to the communication and a parameter defining a service usage condition change, in order for the server to determine that the user's account does not allow the delivery of the service with the service usage condition change, and to transmit to the network element a reply containing a code indicating that the delivery of the service is authorized only with other conditions for using the service, and means for transmitting a second request to the server, the second request containing another parameter defining a service usage condition change different from the one contained within the first request.

The invention also pertains to computer programs capable of being implemented within a server and within a network element, said programs comprising instructions which, when the programs are executed within said server and said communication device, carry out steps according to the inventive method.

Figure 2:
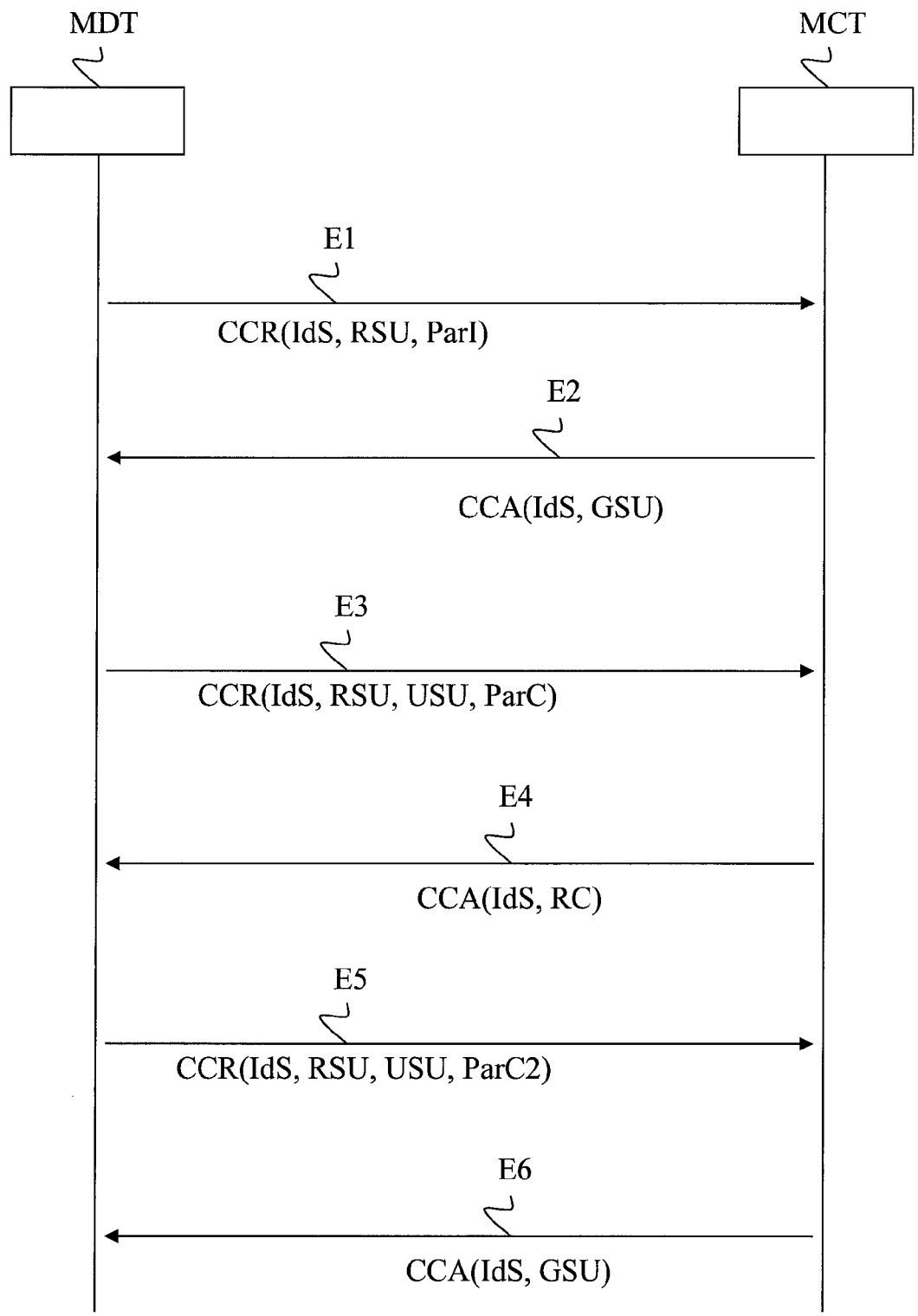

The present invention and the benefits thereof shall be better understood upon examining the description below, which makes reference to the attached figures, in which:

FIG. 1 is a schematic block diagram of a communication system according to one embodiment of the invention for managing changes in conditions for delivering a service; and FIG. 2 is an algorithm of a method for managing changes in conditions for delivering a service according to one embodiment of the invention.

With reference to FIG. 1, a communication system according to the invention comprises a telecommunications network RT, a user terminal TU, a charging trigger module MDT and a charging control module MCT.

In the remainder of the description, the term module may designate a device, a software program, or a combination of computer hardware and software, configured to execute at least one particular task.

The telecommunication network RT may be a wired or wireless network, or a combination of wired and wireless networks.

The user terminal TU is capable of establishing a communication within a telecommunications network RT, for example with another user terminal. A user terminal TU may, for instance, be a landline or mobile telephone, an electronic telecommunication device or object that is personal to the user and which may be a personal digital assistant (PDA) or a smartphone, capable of being connected to an access terminal of a public wireless local area network (WLAN), or a wireless local area network that complies with one of the 802.1x standards, or a medium-range network using the Worldwide Interoperability for Microwave Access (WiMAX) protocol.

The charging trigger module MDT and the charging control module MCT communicate with one other over the telecommunications network RT, of the Internet type. In one variant, the charging trigger module MDT and the charging control module MCT communicate with one other over a local area network or over specialized lines through the network RT.

The charging trigger module MDT and the charging control module MCT may respectively be implemented in different servers, such as application servers.

A particular functionality of the charging trigger module MDT is to ensure that the service is delivered with the assistance of service units authorized by the charging control module MCT, which it regularly triggers in order to do so.

A particular functionality of the charging control module MCT is to determine an authorized number of service units for delivering the service, and to transmit a reply containing that authorized number of service units to the charging trigger module MDT. To that end, the module MCT may determine a rate associated with the account or sub-account to be used to charge the service, and may determine the authorized number of service units based on the rate and on the number of service units remaining in the account or sub-account.

Furthermore, whenever the charging control module MCT receives a number of units that are actually being used for the service, transmitted by the charging trigger module MDT, the module MCT decrements the corresponding account or sub-account.

According to one embodiment of the invention that will be referred to throughout the remainder of the description, the telecommunication network RT is a packet network connected to an IP Multimedia Subsystem (IMS) network.

It is assumed that the user terminal is capable of communicating through the telecommunications network RT connected to the IMS network, for example with another terminal, using communication compliant with the Session Initiation Protocol (SIP). For example, the communication corresponds to an exchange of multimedia flows regarding audio and/or video content, or instant messages. The communication established by the user terminal may also be a communication with a service server, such as a web server or multimedia content server.

The user's profile, containing the services to which that user has subscribed, is saved in a Home Subscriber Server (HSS) server that manages a database particularly containing users' identities, registration information, access parameters, and information needed to invoke the services that the users have subscribed to. In one implementation, the HSS server interacts with other entities of the IMS network using the Diameter protocol.

The control of a communication initiated by the terminal is performed within the IMS network, particularly by three Call State Control Function (CSCF) control entities: the entities Proxy CSCF (P-CSCF), Interrogating CSCF (I-CSCF), and Serving-CSCF (S-CSCF).

The entity P-CSCF is the first point of contact in the IMS network, and its address is discovered by the user terminal when a Packet Data Protocol (PDP) context is activated to exchange SIP messages.

The entity I-CSCF communicates with the entity P-CSCF and with the HSS server to assign the entity S-CSCF to the user based on the user's profile saved in the HSS server.

The entity S-CSCF is in charge of controlling the communication session established by the user terminal and invoking the services to which the user is subscribed.

The charging trigger module MDT monitors the context of the communication established by the user terminal, checking whether the value of at least one piece of data among a predefined context data set has changed. This context data is provided by the telecommunication network and related to the communication. This context data corresponds, for example, to the communication's bit rate, or to the communication's quality of service, or to the type of media used in the communication.

Whenever the charging trigger module MDT detects the expiration of a given period, or a context data value change, the module MDT queries the charging control module MCT so that it can provide the module MDT with information about a change in the communication's charge. The charging trigger module MDT and the charging control module MCT communicate with one another, for example, by means of the Diameter Ro protocol.

The charging control module MCT may be included in an online charging system (OCS), which may be a server located elsewhere in the IMS network.

The charging trigger module MDT may be included in a network element, such as an application server or Gateway GPRS Support Node (GGSN) gateway. For example, the charging trigger module MDT implements a Charging Trigger Function (CTF), which is a central point for collecting relevant information about charging events in the network and monitoring the communication's use of network resources.

The network element, in which is included the charging trigger module MDT, capable of generating charging events while monitoring the communication's use of network resources.

The charging control module MCT determines the present price of a current communication based on a set of parameters and the values of those parameters associated with the price. The parameters are related to the communication, and may partly correspond to context data provided by the network or be based on context data sets.

In one example, there is a parameter for the type of media used in the communication whose value may be either "video" or "audio." The value of this parameter may be equal to the value of a piece of context data that corresponds to the type of media used in the communication. In another example, a parameter is the resolution type of a video used in the communication; its value may be "high" or "low." The value of that parameter may be deduced from the context data values that correspond to the communication's bit rate and the communication's quality of service. In yet another example, a parameter is the number of participants in an audio conference, and its value may be comprised between "3" and "5".

With reference to FIG. 2, a method for managing changes in conditions for delivering a service according to one embodiment of the invention comprises steps E1 to E6 executed within the communication system.

The method is described below with reference to a telecommunication network RT connected to an IMS network as an example.

In step E1, the terminal TU establishes a communication within the network RT, for example with a media server. The terminal transmits a communication session initiation message to the charging trigger module MDT. This message is, for example, an "INVITE" message, and particularly contains an identifier of the type of communication requested by the user, which corresponds, for example, to a session or a video session. The charging trigger module MDT identifies the user's profile and the type of service related to the communication. The module MDT transmits a Credit Control Request (CCR) to the charging control module MCT to request authorization to use the service related to the communication established by the terminal TU.

The request CCR particularly contains an identifier IdS of the service and a number of requested service units (RSUs). The service units may correspond to monetary units or telephone credit units. The request CCR further contains at least one communication parameter ParI that defines an initial condition for using the service, the parameter ParI potentially being a number of participants in a telephone conference, equal to "3" for example, or a resolution of a video, equal to "low" for example.

In step E2, the charging control module MCT determines the communication's initial price, based on a set of parameter values related to the communication and the type of service by means of the identifier IdS. The charging control module MCT verifies that the service can be delivered based on the user's account, meaning if the account contains enough units to authorize the delivery of the service.

The charging control module MCT generates a Credit Control Answer (CCA) containing, in particular, the number of granted service units (GSUs).

The number of GSUs corresponds to a maximum number of units that are debited over the course of the communication, and once all the units have been debited, the charging trigger module MDT must automatically query the charging control module MCT again in order to request a number of RSUs.

The charging control module MCT transmits the reply CCA to the charging trigger module MDT.

In step E3, preferences for using the service are changed, for instance by the user, for instance by increasing the number of participants in a telephone conference, or by increasing the resolution of a video.

The charging trigger module MDT again transmits a request CCR to the charging control module MCT. The request CCR particularly contains the identifier IdS of the service, another number of RSUs and a number of used service units (USUs). If all the GSUs have been debited, the number GSU is equal to the number USU.

The request CCR further contains a communication parameter ParC defining a condition for using the service, the parameter potentially being a number of participants in a telephone conference, equal to "4" for instance, or a video resolution, equal to "high" for instance.

In step E4, the charging control module MCT checks whether the requested change in conditions for using the service allows the delivery of the service based on the pricing conditions and on the user's account.

The charging control module MCT determines that the user's account does not allow the delivery of the service with the service usage condition change. The charging control module MCT produces a message with a Result Code (RC), equal to 4020 for example, indicating that delivery of the service is authorized only with other conditions for using the service, meaning that the service cannot be delivered with the condition change, but may be delivered with the old conditions or potentially other conditions.

The charging control module MCT transmits the reply CCA to the charging trigger module MDT containing the code RC and a validity time VT. The validity time VT defines a period during which the charging trigger module MDT may again request authorization to use the service related to the communication established by the terminal TU, and upon whose expiration the session terminates if no request has been made.

In step E5, the charging trigger module MDT may decide to reject the changed conditions for using the service and to continue delivering the service with the old conditions, or potentially with other conditions.

The charging trigger module MDT again produces a request CCR.

The request CCR particularly contains the identifier IdS of the service and another number of RSUs. The request CCR further contains a communication parameter ParC2 defining a service usage change condition, the parameter potentially being a number of participants in a telephone conference, equal to "3" again for instance, or a video resolution, equal to "low" again for instance, corresponding to the old conditions for using the service. The old conditions therefore correspond to the last conditions with which the delivery of the service has been accepted, meaning the conditions for using the service prior to the transmission of the request CCR in step E1.

The charging trigger module MDT transmits the request CCR with RSU.

In one variant, the request CCR contains a communication parameter ParC2 defining a new service usage condition change different from the condition change requested in step E3 and which does not correspond to the old conditions for using the service, the parameter potentially being a video resolution equal to "medium", for instance.

In step E6, the charging control module MCT determines the current price of the communication based on the conditions for using the service and checks that the service can be delivered based on the user's account, i.e. that the account contains enough units to authorize the delivery of the service.

The charging control module MCT transmits a reply CCA to the charging trigger module MDT, the reply containing, in particular, a number of GSUs.

The invention described here relates to a method, a service, and a network element for managing a communication's pricing changes. According to one implementation of the invention, the steps of the invention are determined by the instructions of computer programs incorporated into the server or network element. The programs comprise program instructions which, when said programs are loaded and executed within the server and network element respectively, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:

1. A method for managing a change in a usage condition of a service associated with a current communication established by a user terminal within a telecommunications network, comprising the following steps in a server included within the telecommunications network:
   after receiving a first request coming from a network element configured to generate charging events while monitoring the communication's use of the network's resources, said request comprising an identifier of a service related to the communication and a parameter defining a service usage condition change,
   determining that a user's account does not allow a delivery of the service with a change in the conditions for using a service and transmitting to the network element a reply containing a code indicating that the delivery of the service is authorized only with other conditions for using the service, in order for the network element to transmit a second request to the server, the second request containing another parameter defining a service usage condition change different from the one contained in the first request;
   wherein the reply contains a validity time defining a period during which the network element may transmit another request to the server, upon whose expiration the session shall terminate if no request has been transmitted.

2. A method according to claim 1, whereby the parameter contained within the second request defines a new service usage condition change, which matches service usage conditions prior to the transmission of the first request.

3. A method according to claim 1, whereby the parameter contained within the second request defines a new service usage condition change different from the requested condition change contained within the first request, and which does not match service usage conditions prior to the transmission of the first request.

4. A method for managing a change in a usage condition of a service associated with a current communication established by a user terminal within a telecommunications network, comprising the following steps in a network element configured to generate charging events while monitoring the communication's use of the network's resources:
   transmitting a first request to a server, said request comprising an identifier of a service related to the communication and a parameter defining a service usage condition change, in order for the server to determine that a user's account does not allow the delivery of the service with the service usage condition change, and to transmit to the network element a reply containing a code indicating that the delivery of the service is authorized only with other conditions for using the service, and
   transmitting a second request to the server, the second request containing another parameter defining a service usage condition change different from the one contained in the first request;
   wherein the reply contains a validity time defining a period during which the network element may transmit another request to the server, upon whose expiration the session shall terminate if no request has been transmitted.

5. A server for managing a change in a usage condition of a service associated with a current communication established by a user terminal within a telecommunications network, comprising:
   a determiner configured to determine that a user's account does not allow a delivery of the service with a change in the conditions for using a service, after the receipt of a first request coming from a network element to generate charging events while monitoring the communication's use of the network's resources, said request comprising an identifier of a service related to the communication and a parameter defining the service's usage condition change,
   a transmitter configured to transmit to the network element a reply containing a code indicating that the delivery of the service is authorized only with other conditions for using the service, in order for the network element to transmit a second request to the server, the second request containing another parameter defining a service usage condition change different from the one contained in the first request;
   wherein the reply contains a validity time defining a period during which the network element may transmit another request to the server, upon whose expiration the session shall terminate if no request has been transmitted.

6. A network element for managing a change in a usage condition of a service associated with a current communication established by a user terminal within a telecommunications network, the network element configured to generate charging events while monitoring the communication's use of the network's resources and comprising:

a first transmitter configured to transmit a first request to a server, said request comprising an identifier of a service related to the communication and a parameter defining a service usage condition change, in order for the server to determine that a user's account does not allow a delivery of the service with the service usage condition change, and to transmit to the network element a reply containing a code indicating that the delivery of the service is authorized only with other conditions for using the service, and a second transmitter configured to transmit a second request to the server, the second request containing another parameter defining a service usage condition change different from the one contained in the first request;

wherein the reply contains a validity time defining a period during which the network element may transmit another request to the server, upon whose expiration the session shall terminate if no request has been transmitted.

7. A non-transitory computer readable medium configured to be implemented within a server for managing a change in a usage condition of a service associated with a current communication established by a user terminal within a telecommunications network, said computer readable medium program-comprising instructions which, when loaded and executed within said server, carry out the following:

after receiving a first request coming from a network element configured to generate charging events while monitoring the communication's use of the network's resources, said request comprising an identifier of a service related to the communication and a parameter defining a service usage condition change, determining that a user's account does not allow a delivery of the service with a change in the conditions for using a service and transmitting to the network element a reply containing a code indicating that the delivery of the service is authorized only with other conditions for using the service, in order for the network element to transmit a second request to the server, the second request containing another parameter defining a service usage condition change different from the one contained in the first request;

wherein the reply contains a validity time defining a period during which the network element may transmit another request to the server, upon whose expiration the session shall terminate if no request has been transmitted.

8. A non-transitory computer readable medium configured to be implemented within a network element for managing a change in a usage condition of a service associated with a current communication established by a user terminal within a telecommunications network, the network configured to generate charging events while monitoring the communication's use of the network's resources said computer readable medium comprising instructions which, when the loaded and executed within said network element, carry out the following:

transmitting a first request to a server, said request comprising an identifier of a service related to the communication and a parameter defining a service usage condition change, in order for the server to determine that a user's account does not allow a delivery of the service with the service usage condition change, and to transmit to the network element a reply containing a code indicating that the delivery of the service is authorized only with other conditions for using the service, and transmitting a second request to the server, the second request containing another parameter defining a service usage condition change different from the one contained in the first request;

wherein the reply contains a validity time defining a period during which the network element may transmit another request to the server, upon whose expiration the session shall terminate if no request has been transmitted.

* * * * *